(12) United States Patent
Romanov et al.

(10) Patent No.: US 7,763,875 B2
(45) Date of Patent: Jul. 27, 2010

(54) SYSTEM AND METHOD FOR SENSING POSITION UTILIZING AN UNCALIBRATED SURFACE

(76) Inventors: Nikolai L. Romanov, 351 Southridge Dr., Oak Park, CA (US) 91377; Dmitri A. Kossakovski, 2042 Pine St., South Pasadena, CA (US) 91030

( * ) Notice: Subject to any disclaimer, the term of this patent is extended or adjusted under 35 U.S.C. 154(b) by 0 days.

(21) Appl. No.: 11/517,862

(22) Filed: Sep. 7, 2006

(65) Prior Publication Data
US 2007/0051884 A1 Mar. 8, 2007

Related U.S. Application Data

(60) Provisional application No. 60/715,051, filed on Sep. 7, 2005, provisional application No. 60/741,755, filed on Dec. 2, 2005.

(51) Int. Cl.
G01N 21/86 (2006.01)
H01L 27/00 (2006.01)

(52) U.S. Cl. .................. 250/559.29; 250/208.1

(58) Field of Classification Search ............. 250/208.1, 250/208.2, 221, 559.29, 559.4, 559.46, 559.42, 250/559.44, 231.13–231.18; 345/156–167; 356/600, 607, 614, 617, 237.4, 237.5
See application file for complete search history.

(56) References Cited

U.S. PATENT DOCUMENTS

| 4,114,035 A | | 9/1978 | Herzog |
| 4,855,915 A | * | 8/1989 | Dallaire ...................... 701/23 |
| 4,877,326 A | | 10/1989 | Chadwick et al. |
| 5,023,922 A | | 6/1991 | Abramovitz et al. |
| 5,085,517 A | | 2/1992 | Chadwick et al. |
| 5,578,813 A | * | 11/1996 | Allen et al. .............. 250/208.1 |
| 5,644,139 A | | 7/1997 | Allen et al. |
| 5,729,008 A | | 3/1998 | Blalock et al. |
| 5,961,559 A | * | 10/1999 | Shimbara et al. .............. 701/23 |
| 5,994,710 A | | 11/1999 | Knee et al. |
| 6,246,050 B1 | | 6/2001 | Tullis et al. |

(Continued)

FOREIGN PATENT DOCUMENTS

DE 4234849 C1 4/1994

(Continued)

OTHER PUBLICATIONS

Displacement Measurement by a Linear Encoder Using a Diode Array, Published on IP.com on Feb. 8, 2005.

(Continued)

*Primary Examiner*—Que T Le
*Assistant Examiner*—Pascal M Bui-Pho
(74) *Attorney, Agent, or Firm*—Vincent K. Gustafson; Intellectual Property Technology Law

(57) ABSTRACT

Systems and methods adapted for use with uncalibrated patterned surfaces for sensing any of position, displacement, velocity, acceleration, area, and volume are provided. A system includes a memory, processing electronics, and at least one readhead adapted to move relative to the surface and including a radiation source, lens, and an optical array transducer. One aspect includes generating a mapping data set representative of an intensity map of the patterned surface. Another aspect provides a variable travel speed readhead. Other aspects include multiple readheads adapted to travel in concert. Incremental and absolute sensing are provided, including systems having sub-pixel spatial resolution.

48 Claims, 9 Drawing Sheets

U.S. PATENT DOCUMENTS

| | | | |
|---|---|---|---|
| 6,433,780 | B1 | 8/2002 | Gordon et al. |
| 6,556,153 | B1 | 4/2003 | Cardamone |
| 6,642,506 | B1 | 11/2003 | Nahum et al. |
| 6,765,195 | B1 | 7/2004 | Leviton |
| 6,828,517 | B2 | 12/2004 | Calkin et al. |
| 6,934,613 | B2* | 8/2005 | Yun ............................ 701/41 |
| 7,119,323 | B1 | 10/2006 | Brosnan et al. |
| 7,199,386 | B2* | 4/2007 | Capaldo et al. .......... 250/559.4 |
| 7,310,141 | B2* | 12/2007 | Uda et al. ................. 356/237.5 |
| 2004/0238725 | A1 | 12/2004 | Ornellas et al. |
| 2005/0036662 | A1 | 2/2005 | Brosnan |
| 2005/0246078 | A1* | 11/2005 | Vercammen ................ 701/23 |
| 2006/0243895 | A1* | 11/2006 | Nordenfelt et al. ..... 250/231.13 |

FOREIGN PATENT DOCUMENTS

| | | |
|---|---|---|
| EP | 0999521 A2 | 5/2005 |
| GB | 2394543 A | 4/2004 |
| JP | 2297006 A | 7/1990 |
| JP | 02-297006 A | 12/1990 |
| JP | 05-215532 A | 8/1993 |
| JP | 9-292215 A | 11/1997 |
| JP | 2771594 B2 | 2/1998 |
| JP | 3699320 B2 | 9/2005 |
| SU | 1259112 A1 | 9/1986 |
| WO | 2007/015271 A1 | 2/2007 |

OTHER PUBLICATIONS

Rovati, Fabrizio S., et al., Spatial-temporal motion estimation for image reconstruction and mouse functionality with optical or capacitive sensors, IEEE Transactions on Consumer Electronics, Aug. 2003, pp. 711-718, vol. 49, No. 3.

Tartagni, M., et al., A photodiode cell for applications to position and motion estimation sensors, IEEE Transactions on Industrial Electronics, Feb. 1996, pp. 200-206, vol. 43, No. 1.

Yamaguchi, Ichirou, Real-Time Measurement of In-Plane Translation and Tilt by Electronic Speckle Correlation , Jpn. J. Appl. Phys., Mar. 5, 1980, pp. L133-L136, vol. 19, No. 3.

"Device for measuring displacement of object has differential amplifier with inputs to selection and memory units with output to time interval meter," Database WPI, Section EI, Week 198719, Derwent Publications Ltd., London, GB, Class 502, AN 1987-134715, XP002352176, providing English language abstract of Soviet Union Patent Publication SU1259112A to Goskov, P. (assignee: Altai Poly) entitled Device for Measuring Object Displacement, Sep. 23, 1986.

* cited by examiner

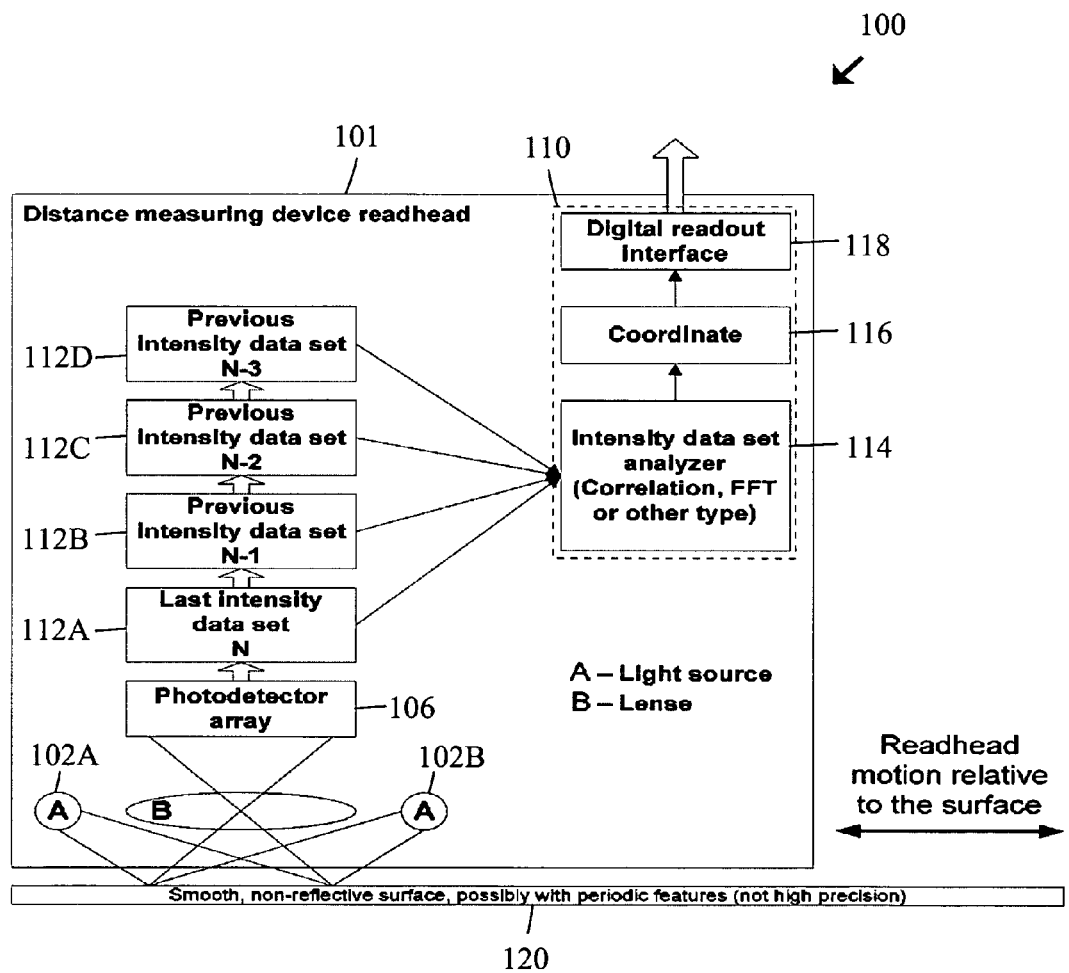
FIG._1

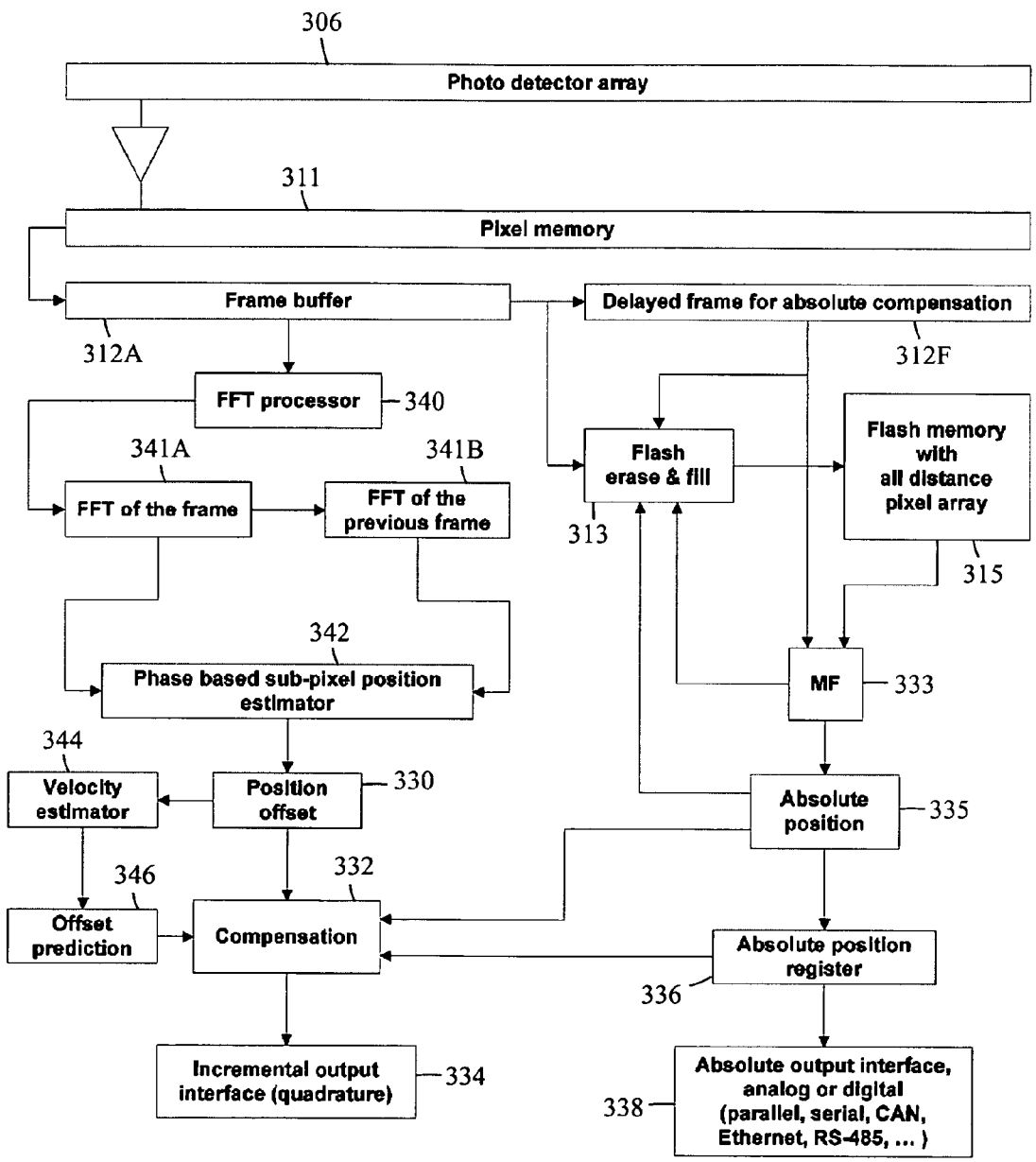
FIG._2B

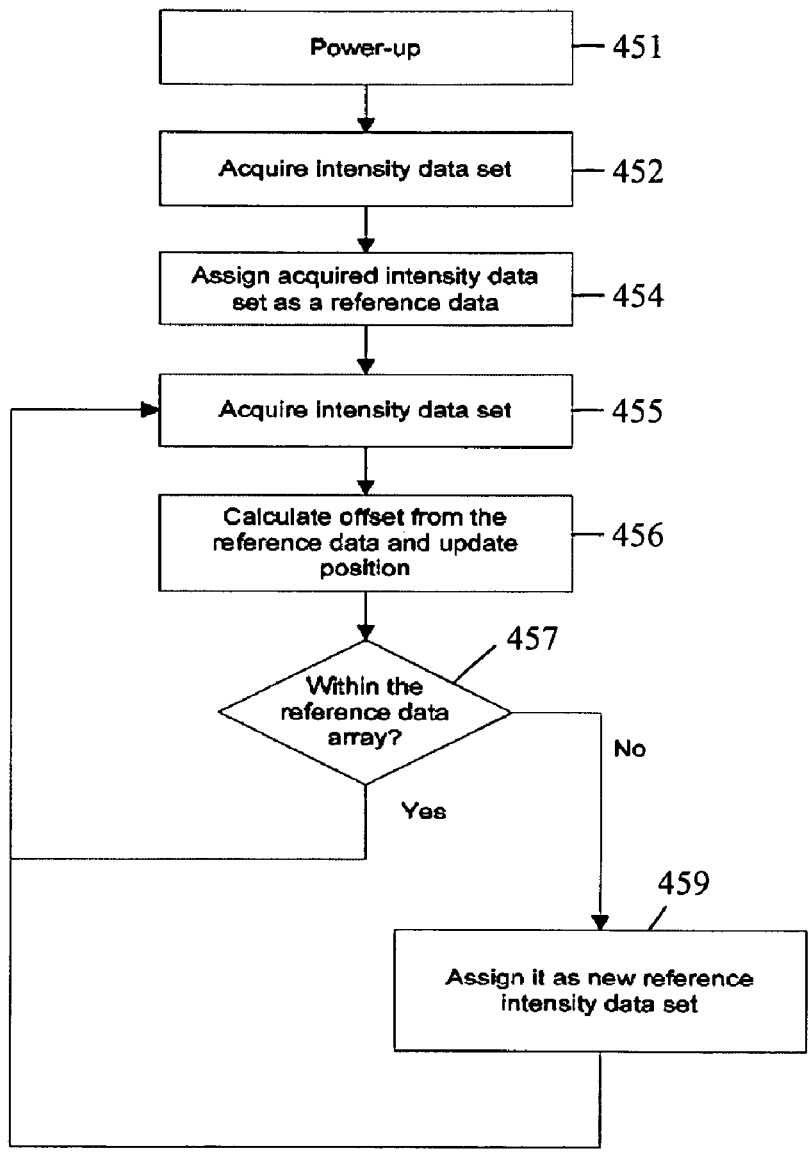
FIG._3

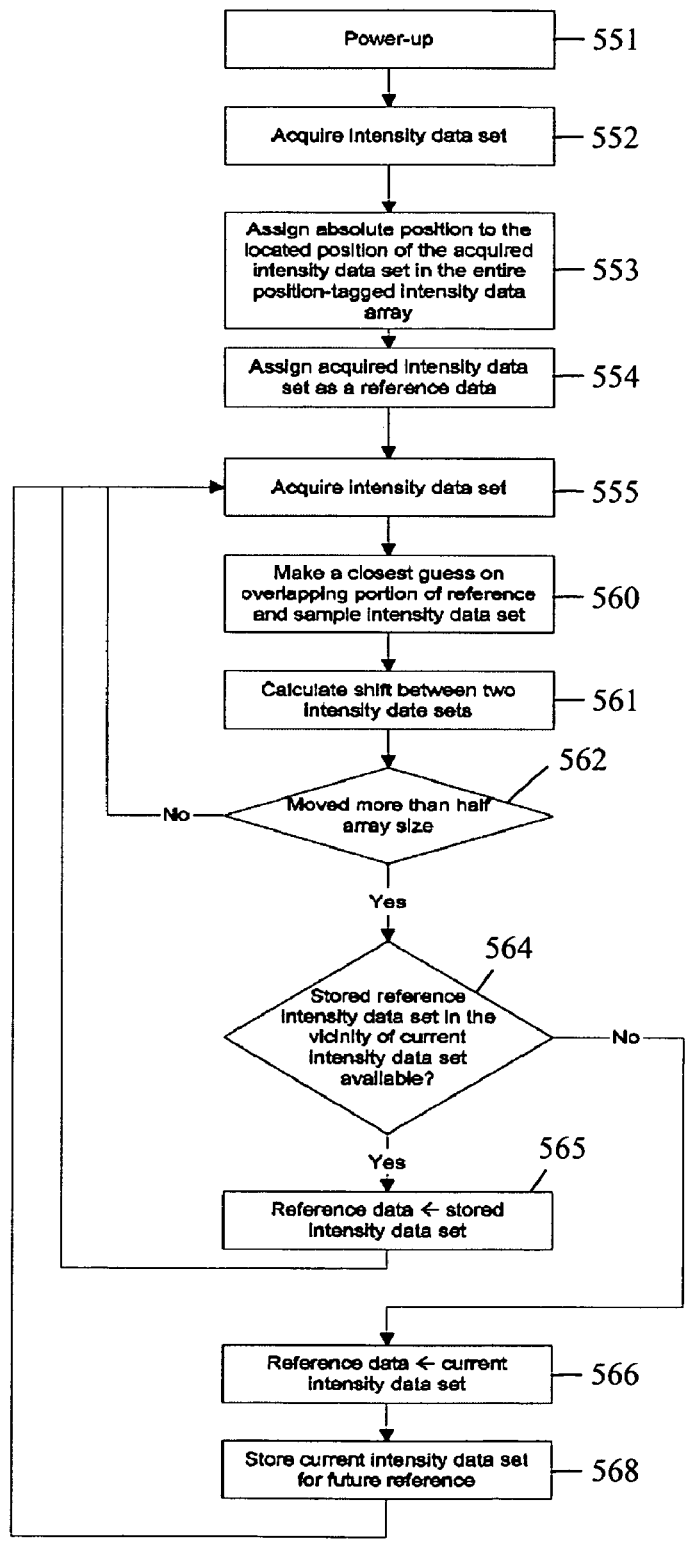
FIG._4

SYSTEM AND METHOD FOR SENSING POSITION UTILIZING AN UNCALIBRATED SURFACE

CROSS-REFERENCE TO RELATED APPLICATIONS

The benefit of priority of U.S. Provisional Application No. 60/715,051 filed Sep. 7, 2005 in the names of Nikolai L. Romanov and Dmitri A. Kossakovski for "Linear Imaging Encoder," and U.S. Provisional Application No. 60/741,755 filed Dec. 2, 2005 in the names of Nikolai L. Romanov and Dmitri A. Kossakovski for "Positional Sensing System and Method," is hereby claimed under the provisions of under 35 USC 119(e).

BACKGROUND OF THE INVENTION

1. Field of the Invention

This invention relates to systems and methods for sensing any of position, displacement, velocity, acceleration, area, and volume. Such systems and methods may be useful in industrial automation, microscopy, surface profiling, scanning, printing, material deposition, and metrology.

2. Description of the Related Art

Linear encoders are used to measure variable linear positions of industrial machinery and generate output signals of these positions, rather than simply indicate the presence or absence of a target with discrete on-off signals, as do proximity sensors. The encoders are essential for precise operation of machines in fabrication or robotics applications.

A typical optical encoder consists of two parts: a scanning unit and a scale. The scanning unit contains a radiation source, a condenser lens, a reticle with grated windows, and a photodetector. Most manufacturers use line-grated glass or metal scales that mount on a machine base, while the unit is connected to the moving slide of the machine. When the scanning unit moves, a parallel beam of light passes through the condenser lens, then through the windows on the scanning reticle, and onto the reflective grated scale. Reflected light passes back through the scanning windows and strikes the photodetectors. These sensors convert the fluctuation in light intensity into analog sinusoidal electrical signals that are phase shifted by 90.degree. These outputs are sent to a digital readout or numerical controller for interpolation and subsequent decoding to give an up/down count showing the position of the moving slide. There are two types of linear encoders—incremental and absolute. An incremental encoder needs to find the home position (origin) every time it is turned on. It then calculates the position by measuring incremental distance from home. An absolute encoder can determine its position after being turned on without homing operation. In a conventional optical encoder, the absolute measurement is achieved by using a complex grating that indicates absolute position information in addition to incremental scale divisions.

Conventional grating-based encoders suffer from various limitations that restrict their utility. One limitation is the high cost of calibrated gratings. This cost is elevated due to the necessities of high precision fabrication, the use of stable (e.g., thermally stable) materials, and the functional relationship between cost and length (since longer encoders require commensurately longer gratings). Currently, encoders cost several hundred dollars per meter per axis in mass quantities. It is common for a multi-axis industrial machine or robotic apparatus to use multiple encoders, with one encoder for each degree of freedom of movement. Absolute encoders are typically more expensive than incremental ones due to the increased complexity. Another limitation associated with conventional linear encoders is their sensitivity to scratches, damage, and contamination. Yet another limitation associated with conventional linear encoders is their limited ability to provide extremely fine resolution, particularly without substantially increased cost.

Any optical lens or system has a viewing angle that results in undesirable scale change relative to the object distance from the lens. Telecentric lenses, which provide depth of field while holding magnification constant, have been developed to minimize this effect. A typical commercial telecentric lens has a viewing angle of 0.2 degree. Such a viewing angle, while small, still causes a perceptible scale change that limits the measuring accuracy and affect the mounting tolerances for an optical system.

One encoder that addresses certain limitations associated with conventional encoders is disclosed in U.S. Pat. No. 6,246,050 to Tullis, et al. ("Tullis"). Tullis discloses an optical encoder having a photosensor array that detects relative movement of an uncalibrated target surface (e.g., a surface having natural surface features). The photosensor array generates a sequence of data frames of the imaged areas, and a processor processes patterns in the data frames to detect a relative motion or displacement of the target to determine incremental relative motion or rate of relative motion. To enhance detectability of some random surface features, the target surface can be illuminated at a high incidence angle (e.g., 15 to 60 degrees) relative to the surface normal. A telecentric lens may be used between the target surface and photosensor (Tullis, col. 9). For purposes of absolute position measurement (described as useful to eliminate runout errors in otherwise incremental position measurements), Tullis (at col. 10) further discloses the addition of a unique and identifiable pattern, such as (1) a printed density that varies as a sine wave with continuously increasing spatial frequency, or (2) a pair of diverging lines, overlaid on top of a random field. Images of these printed patterns are compared with previously captured patterns or reference images to output pulses when correlations are found. Tullis teaches that "absolute measurement is thereby made when the second correlation is found" (Tullis, col. 10, lines 39-41), suggesting some calibration between printed pattern placement and absolute position. In this regard, Tullis's utilization of a printed pattern is analogous to the use of a calibrated scale, with the inherent drawbacks attendant to such a scale.

Tullis suffers from certain limitations that restrict its utility. A device according to Tullis may have insufficient speed at high-resolution operation to be suited for use with target surfaces of extended length. The unique and identifiable patterns taught by Tullis for providing absolute position measurement may also have limited application to high-resolution target surfaces of extended length. Furthermore, Tullis fails to address potential problems associated with surface alteration. Additionally, Tullis describes the use of telecentric lenses (which limit measuring accuracy).

Based on the foregoing, there is a need for improved systems for positional sensing systems. Ideally, improved systems would be economical, versatile, and adapted to provide extremely fine positional sensing resolution.

SUMMARY OF THE INVENTION

In one aspect, the invention relates to a method for sensing any of position, displacement, velocity, acceleration, area, and volume utilizing (1) a memory, (2) processing electronics, (3) an uncalibrated patterned surface; and (4) at least one readhead having a radiation source, a lens, and a multi-pixel optical array transducer positioned to receive radiation emanating from the radiation source, the method including the steps of: providing an uncalibrated patterned surface; positioning the at least one readhead proximate to the patterned surface; effecting relative movement between the at least one readhead and the patterned surface; acquiring a plurality of position-dependent intensity data sets using the optical array transducer; and generating a mapping data set representative of an intensity map of the patterned surface, said mapping data set being distinct from any data set of the plurality of position-dependent intensity data sets.

In another aspect, the invention relates to a method for sensing any of position, displacement, velocity, acceleration, area, and volume utilizing (1) a memory, (2) processing electronics, (3) an uncalibrated patterned surface; and (4) at least one readhead having a radiation source, a lens, and a multi-pixel optical array transducer positioned to receive radiation emanating from the radiation source, the method comprising the steps of: positioning the at least one readhead proximate to the patterned surface; identifying a desired readhead destination; effecting relative movement between the at least one readhead and the patterned surface at a first travel speed to a first position proximate to the desired readhead destination; decelerating any of the patterned surface and the at least one readhead to a second travel speed upon attainment of the first position; and effecting relative movement between the at least one readhead and the patterned surface from the first position to the desired readhead destination at the second travel speed.

In another aspect, the invention relates to a system for sensing any of position, displacement, velocity, acceleration, area, and volume utilizing an uncalibrated patterned surface, the system comprising: a memory; processing electronics; and a plurality of readheads disposed proximate to and moveable in concert relative to the uncalibrated patterned surface. Such plurality of readheads may be disposed in various orientations, including (1) with a first readhead disposed along a first side of the patterned surface, and a second readhead disposed along a second side of the patterned surface; and (2) with a first readhead and a second readhead disposed at different angles along a first side of the patterned surface.

In another aspect, the invention relates to apparatuses and devices adapted to perform the foregoing methods and systems.

In another aspect of the invention, any of the foregoing aspects may be combined for additional advantage.

Other aspects, features and embodiments of the invention will be more fully apparent from the ensuing disclosure and appended claims.

BRIEF DESCRIPTION OF THE DRAWINGS

FIG. 1 illustrates a top-level block diagram of a positional sensing system according to an embodiment of the present invention.

FIG. 2B illustrates a functional block diagram of a photodetector array and processing electronics based on a Fast Fourier Transform, all according to another embodiment of the present invention.

FIG. 3 illustrates a flowchart for various steps of a relative or incremental positional sensing method according to one embodiment of the present invention.

FIG. 4 illustrates a flowchart for various steps of an absolute positional sensing method according to another embodiment of the present invention.

DETAILED DESCRIPTION OF THE INVENTION, AND PREFERRED EMBODIMENTS THEREOF

Figure 2A:
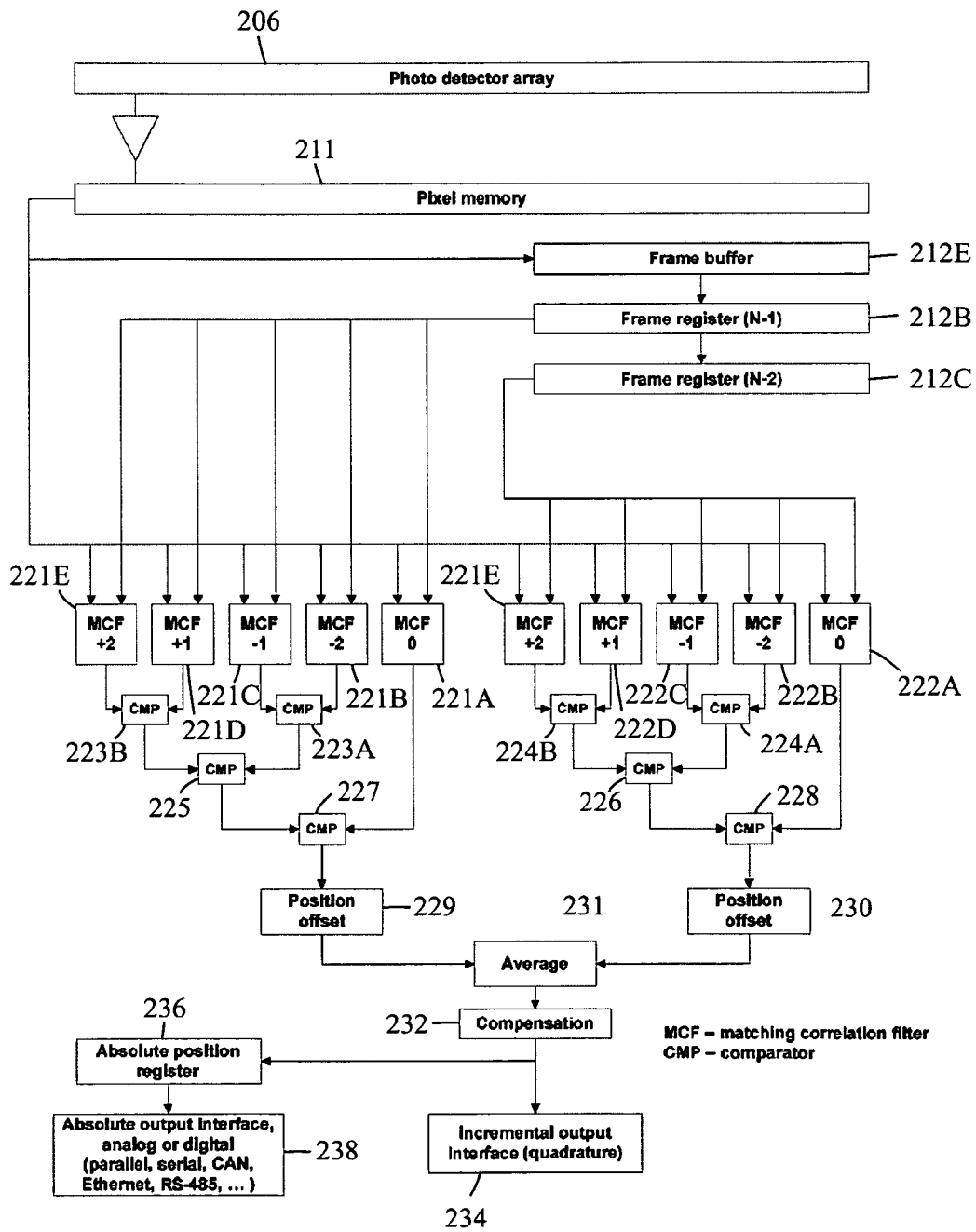
FIG. 2A illustrates a functional block diagram of a photodetector array and processing electronics based on a Correlation Filter, all according to an embodiment of the present invention.

Certain embodiments of the invention are directed to positional sensing systems utilizing real-time pattern analysis and positional determination, utilizing an uncalibrated patterned surface. The term "uncalibrated patterned surface" as used herein refers to any surface having surface features, whether inherent or introduced, perceptible (e.g., at a sufficient signal-to-noise ratio) to an imaging device, without requiring calibration and present in amount or spatial density sufficient to provide a desired dimensional resolution utilizing the inventive positional sensing systems and methods described herein. The attainable resolution of the positional sensing systems described herein depends in part on the quality and perceptibility of the surface features. The patterned surface may include a patterned film, such as a self-adhesive patterned film, applied to an underlying surface. The pattern may be regular or irregular, with the patterned surface preferably consisting of subareas, equivalent to size to the optical frame capture area, having unique patterns relative to one another. The patterned surface may include machining marks, stippling, peening marks, sandblasting marks, or the like.

FIG. 1 provides a top-level block diagram of a positional sensing system 100 according to an embodiment of the present invention. The system 100 comprises a readhead 101 and a feature-rich surface 120 relative to which the readhead 101 is adapted to move (or the surface may be adapted to move relative to the readhead). The surface 120 could have periodic markings similar to a barcode to facilitate image synthesis. Such barcodes need not be precise or regular in their placement. Indeed, the unpatterned surface 120 is preferably uncalibrated. The readhead 101 includes at least one radiation source 102A-102B adapted to illuminate the surface 120, a lens 104, a multi-pixel optical array transducer 106 (such as a photodetector array), and processing electronics 110. The radiation source is preferably adapted to flash repetitively to minimize blurring at high travel speeds, with the flash rate preferably being variable with travel speed. The lens 104 is adapted to form an image of the surface 120 on the optical transducer 106. One or more memory (or memory register) blocks 112A-112D are provided, preferably within the processing electronics 110, to store intensity data sets obtained previously to permit their comparison by the process electronics 110 with subsequently-obtained intensity data sets. The processing electronics 110 preferably include an intensity data set analyzer element 114 (e.g., correlation analyzer, Fourier Fast Transform analyzer, or other equivalent type), a coordinate calculation or determination element 116, and a digital readout interface element 118. The processing electronics 110 preferably include a microprocessor implementing pre-defined or user-defined instructions coded in software.

FIGS. 2A-2B provide block diagrams of the photodetector array 106 and processing electronics 110 according to two different embodiments. The array 106 and electronics 110 can be located on the same semiconductor chip, or can be divided into two or more different chips with dedicated functionalities. The photodetector array 106 or matrix captures snapshot images of the underlying surface 120 (as shown in FIG. 1) at a frame rate, F, preferably utilizing a high speed, high rate freeze-frame electronic shutter (not shown). The freeze-frame feature of the imager makes sure that all pixels of the array 106 are exposed simultaneously. One or more images, acquired immediately before the current one, are stored in the internal memory (e.g., memory blocks 112A-112D, collectively the memory element 112 as shown in FIG. 2A) for processing. The image analyzer 114 (part of the processing electronics 110 of the readhead 101) determines how far and in what direction the current image is offset relative to images stored in the memory 112, based on known/calibrated geometry of the sensor 106 and optics 104. Using the offset information, the analyzer 114 estimates with a high precision how far the photodetector array 106 moved along the surface 120 and at what speed. Data analysis and signal generation algorithms are described below.

FIG. 2A shows a first processing approach based on a Correlation Filter, where a current image is compared to one or more predecessors and/or to images from a pre-recorded map. A photodetector array 206 acquires an image from a patterned surface (e.g., surface 120 shown in FIG. 1) and intensity data corresponding to the image is supplied to pixel memory 211. Pixel memory data is conveyed to both a frame buffer 212E and a plurality of matching correlation filters 221A-221E, 222A-222E, which also receive data from multiple frame registers 212B, 212C. Data from the matching (−1 and −2) correlation filters 221C, 221B and 222C, 222B, respectively, are compared in comparator elements 223A, 224A, respectively, while data from the matching (+1 and +2) correlation filters 221D, 221E and 222D, 222C, respectively, are compared in comparator elements 223B, 224B, respectively. Thereafter, the outputs of comparator elements 223A, 223B are compared in comparator element 225, while the outputs of comparator elements 224A, 224B are compared in comparator element 226. Then, the output of the comparator element 225 is compared with matching correlation filter 221A in comparator element 227, while the output of the comparator element 226 is compared with matching correlation filter 222A in comparator element 228. The outputs of the comparator elements 226, 228 are provided to position offset elements 229, 230, with outputs thereof being supplied to an averaging element 231, with the averaged value 231 subject to compensation in compensation element 232. Finally, an incremental output signal is provided to an incremental output interface or quadrature 234, and/or an absolute position register is used to generate an absolute position signal that is provided to an absolute output interface 238, which may be analog or digital (e.g., parallel, serial, CAN, Ethernet, RS-485, or the like). In this manner any of incremental and absolute position can readily be determined with a high degree of precision.

FIG. 2B shows a second processing approach where the image comparison is done in the spatial frequency domain after performing a Fast Fourier Transform (FFT) on the image. A FFT provides amplitudes and phases for sine waves forming an image. The phase difference for two images at the same frequency is proportional to the linear shift between two. Since all spatial information is accounted in FFT for calculation of each frequency component very high sub-pixel resolution can be achieved with predictable certainty.

Referring to FIG. 2B, a photodetector array 306 acquires an image from a patterned surface (e.g., surface 120 shown in FIG. 1) and intensity data corresponding to the image is supplied to pixel memory 311. An associated frame buffer 312A receives data from the pixel memory 311 and conveys data to a FFT processor 340. A FFT of the instant frame 341A and a FFT of the previous frame 341B are provided to a phase-based sub-pixel position estimator 342. A position offset element 330 receives data from the position estimator 342 and conveys offset data to both a velocity estimator 344 and a compensation element 332. The compensation element 332 also receives (relative position) data from an offset prediction element 346 communicatively coupled to the velocity estimator 344, and absolute position data from an absolute position computation element 335 and absolute position register 336, in order to generate incremental position data and communicate the same to an incremental output interface or quadrature 334.

In this embodiment, the coordinates may be sent to a digital and/or analog readout decoding to give an up/down count indicating the position of the moving readhead. This method gives an excellent position error from frame to frame depending on motion speed. However, position error tends to accumulate over a period of time as a linear function of frame counts. In order to eliminate the error a special circuit (or subroutine) may be added to the processing electronics. In such an embodiment, an accumulation device includes a memory array (or delayed frame) 312F filled on the fly with images (e.g., groupings of information representing images) of portions of the underlying surface. These images are mapped with absolute position referenced from the point of last power-up (and/or from the origin found in the homing operation). A collection of referenced images may be referred to as a map. This "build as you go" map may be used to locate current image position on subsequent runs relative to already mapped regions to eliminate undesirable accumulation of position error. The processing electronics may execute an algorithm that allows the current image to be located on the recorded map.

Once the map of a traveling path along the surface is completed (preferably including the entire path of travel), the map can be stored in an on-board FLASH memory element 315 for absolute position recovery upon power-up. The map is preferably stored in digital form, such as in matrix of groupings of information representing images correlated to position information relating to those images. A flash erase and fill element 313 is provided in communication with the flash memory element 315 to manage additions to and deletions from the flash memory 315. A filter 333 receives data from the delayed frame 312F and the flash memory 315 and is communicatively coupled to an absolute position determination element 335 having an associated absolute position register 336. An absolute output position interface 338, either analog or digital (e.g., parallel, serial, CAN, Ethernet, RS-285, or equivalents) communicates information from the absolute position register 336 to a desired output device.

Thus, the positional sensing system can be used for both incremental and absolute positional sensing without additional cost.

Positional sensing systems according to the present invention may be utilized in various different operating modes. Depending on the needs of a particular application, the hardware and software functionality of a particular positional sensing system as described herein will enable the system to operate in different modes.

Mode 1: One-Dimensional, Incremental Linear Optical Detection for Positional Sensing Along a Surface Having Arbitrary Marks.

A first operating mode preferably includes the following features or characteristics:
  a) At least one radiation source 102A-102B (e.g., adapted to emit visible radiation, infrared radiation, or radiation of another desired spectral range, with a source example including one or more LEDs) illuminates a surface which reflects light along a portion of the distance to be measured.
  b) An uncalibrated patterned surface 120 (e.g., a tape which has light-dark bar or pixellated pattern(s) along or orthogonal to the direction of measurement). The surface can be arbitrary; the addition of a tape just provides high contrast.
  c) Radiation reflected from the surface 120 is focused onto a multi-pixel optical (e.g., 1-D) array transducer 106, 206, 306 (e.g., a photo-array), aligned with its length in parallel to the direction of measurement.
  d) As the radiation source 102A, 102B and optical transducer 106, 206, 306 move in concert, the "intensity data" is periodically stored.
  e) Data storage and processing is preferably performed with a dedicated microprocessor and memory.
  f) A real-time FFT and/or auto-correlator calculates incremental movement. The acquired data may be used in various ways to provide incremental measurement in order to minimize the error in precision.
  g) Calibration is preferably "internal," meaning that the positional sensing device is calibrated before it is installed. The basis for the calibration is the geometry of the device, i.e. pixel size and number of pixels. No external calibration is needed.

A flowchart for various steps 451-459 of a relative or incremental positional sensing method, such as may be implemented in software and hardware, is depicted in FIG. 3. After powering up in step 451 and acquiring an intensity data set in step 452 from the transducer (e.g., sensor array) at the powerup position, this data set is assigned to be a reference data set in step 454. The software is then cycling through a loop where intensity data sets are acquired in step 455 at a rate supported by the hardware and suitable for the application. After the data set acquisition step 455, the current data set is compared to the reference set to determine overlapping portions of these two sets. An offset (shift) value is calculated by comparing the current data set to the reference data set (by using a correlation and/or FFT approaches described above) in step 456. The resulting distance/displacement signal may be presented to the outside electronics in required format.

The software then makes a determination if the occurred displacement is within the reference data set in step 457. If "yes," then the software returns to the intensity data set acquisition step 455. If "no," then the software assigns the current data set to be a new reference data set in step 459 and returns to the intensity data set acquisition step 455.

Mode 2: Addition of "Mapped" Intensity Data

A second method or operating mode, adapted to provide absolute positional sensing, preferably includes the following features or characteristics:
  a) Intensity data is acquired along the length of a predetermined, repeatedly traversed path and a mapping data set or memory array representative of an intensity map of the patterned surface is generated, and preferably periodically updated, such as to accommodate changes to the patterned surface by damage or contaminants. The mapping data set preferably contains intensity data for the entire length of the surface (e.g., of the predetermined path). Additionally, the mapping data set is preferably distinct from any single position-dependent intensity data set corresponding to a single image capture. Mere storage of each and every position-dependent intensity data set would be highly inefficient in terms of both storage and comparison. Instead, the mapping data set is preferably generated by processing a plurality of position-dependent intensity data sets (e.g., by averaging or comparing overlapping data sets by any appropriate means to eliminate duplicative information and yield a single map substantially condensed relative to a compilation of all overlapping individual intensity data sets). The mapping data set preferably contains intensity data corresponding to the entire length of the patterned surface along which relative readhead travel is contemplated.
  b) Position is determined by comparing current intensity data from that mapped in memory.
  c) Small (sub-pixel) movements can still be incremental. And, in fact, the "mapped" intensity can also be updated, for example, in case there is a substantial change in the surface conditions.
  d) The intensity data is preferably stored along the entire distance to be traversed, which can be used to be compared with data during actual use.
  e) Still, the accuracy is dependent on the overall quality of internal calibration of the "measuring device" (including optics as well as photo-array).

A flowchart for various steps 551-568 of positional sensing method adapted provide absolute positional sensing, is depicted in FIG. 4. After powering up in step 551 and acquiring an intensity data set in step 552 from the sensor array at the power-up position, an absolute position is assigned to the located position of the acquired intensity data set in the entire mapped intensity data array in step 553, and the acquired data set is assigned to be a reference data set in step 554. The software is then cycling through a loop where intensity data sets are acquired at a rate supported by the hardware and suitable for the application. After the data set acquisition step 555, the current data set is compared to the reference set to determine overlapping portions of these two sets.

The software then makes a determination if the occurred displacement exceeds a user-defined threshold fraction of the array size (e.g., half is the fraction chosen here for explanation purposes, but other fractional values can be used in certain implementations to optimize the performance). Such function is implemented in a first step 560 in which a closest guess is made on overlapping portions of reference and sample intensity data sets, a second step 561 in which a shift between two intensity data sets is calculated, and an array movement comparison step 562. In the comparison step 562, if the displacement is less than half (or other predefined threshold portion) of the array size, then software returns to the intensity data set acquisition step 555. If the displacement exceeds half of the array size (or other predefined threshold portion), then the software queries the on-board memory in step 564 to determine if the memory contains a previously recorded and stored reference data set which is different from the current reference data set. If "yes", then the previously stored intensity data set is assigned to become the new reference data set in step 565, and the software returns to the intensity data set acquisition step 555. If "no," then the current data set is assigned to become a new reference data set in step 566, and it is stored in the memory along with its associated position information for future reference in step 568. The software then returns to the intensity data set acquisition step 555.

As a result of this method, a library of position-mapped intensity data sets along the traversed path is built up and updated during the device operation. This library is preferably stored in non-volatile memory and is accessible to the device during next power up event.

Mode 3: Addition of External Calibration to Mode 1 and/or Mode 2

A third operating mode including the addition of external calibration to any of the preceding modes or combinations thereof, preferably includes the following features or characteristics:

a) A "yard-stick" or other scale provides an external means for absolute calibration, either at factory or during device installation.

b) Absolute calibration may require only a "zero" and "maximum distance", or additional measurements along the traversed path.

Mode 4: Addition of an Uncalibrated Patterned Surface Having Uniquely Patterned Portions A fourth operating mode including the addition of an uncalibrated patterned surface having uniquely patterned portions to any of the foregoing modes or combinations thereof. In the absence of any assurance that "mapped" intensity data for each portion of the pattered is unique along the overall distance of the patterned surface, a positional sensing system would need to be "zeroed" upon start-up; i.e., the readhead would go to a designated location known to be unique. Additionally, the speed of a positional sensing system may be limited to a prescribed rate. The fourth operating mode addresses these concerns, and preferably includes the following features or characteristics:

a) The uncalibrated surface includes a plurality of patterned portions, with each portion having a pattern that is unique relative to each other portion to facilitate absolute positioning.

c) The uniquely patterned surface may be patterned with a (e.g., self-adhesive) patterned film or any other technique including permanent marking by material deposition and material removal (e.g., the use of grinding or burnishing tools applied with controlled or intentionally random travel means).

d) The observed pattern is compared to a stored reference (e.g., a lookup table or equivalent) to ascertain absolute position.

Various embodiments of the present invention present a number of advantageous and inventive features and characteristics, including, where applicable to a particular embodiment:

1) Elimination of the need for a precision grating/scale for incremental and/or absolute encoder operation. Positional sensing systems as described herein are intended for use with any non-reflective and preferably smooth surface, provided that the surface has a sufficient amount of surface features (whether inherently present or added) for pattern recognition as described herein. Inherent marks may include surface textures, machining marks, and the like.

2) Absence of a precision grating improves tolerance to contamination and/or damage.

3) Sensing operation is not limited by length of the measured displacement (i.e., the cost is substantially independent of length).

4) Sensing can operate both in incremental and absolute modes.

5) Sensing can utilize either internal or external calibration.

6) Sensing may be utilized for motion along any predefined motion path, not necessarily linear (e.g., segmented linear, curved, curvilinear, sinusoidal, two-dimensional, three-dimensional, etc.).

7) Sensing systems provided herein are more robust than conventional encoders and more tolerant of mechanical perturbations including transient shocks and/or vibrations. Conventional fringe-counting type encoders are very sensitive to mechanical perturbations, as such perturbations cause skipped counts that lead to large errors. Systems provided herein, however, have increase tolerance to such effects, as the position of the readhead after experiencing perturbation can still be ascertained by comparing the current pattern with a reference frame.

8) All or substantially all of the electronics and sensing elements required for the positional sensing systems provided herein may be integrated on a single semiconductor platform if desired.

9) Alternatively, an optical array transducer (chip) can be separated from any other portion of the electronic hardware to reduce readhead size, improve system flexibility, and facilitate the use of standardized components to achieve reductions in system fabrication cost.

10) Relaxed requirements as to the precision of optics (compared to regular optical encoders) translate into relaxed requirements to the installation precision and improved duration of maintenance-free operation.

Additional desirable advantages of, enhancements to, and applications for the positional sensing systems and methods provided herein are discussed below.

A noteworthy advantage of embodiments of the present invention includes sub-pixel spatial resolution, based on the use of photodetector with a large array size and a dynamic range of individual pixels. Traditional linear encoders utilize gratings with fine-spaced periodic marks as a ruler. The spacing of the marks defines the basic resolution of the measurement. Vendors of conventional linear encoders claim the spatial resolution of their encoders to be a small fraction of the spacing between the marks, based on various interpolation approaches. In other words, this "super-resolution" is not a real, measured quantity, but rather a product of mathematical operation using sparse physical data. Positional sensing systems according to embodiments of the present invention circumvent these limitations by performing real, physical measurements based on pixel size—i.e., at a spatial resolution far below the characteristic size of the measurement system In order to explain this sub-pixel measurement functionality, consider a high contrast image of the measured surface to be projected on the array (high contrast is a helpful feature but not a necessary requirement). For the purpose of discussion, 1:1 imaging optics are assumed, although magnifying optics can be used to gain even further spatial resolution. Consider a pixel on which a bright/dark boundary is projected. The signal produced by this pixel is proportional to the size of the bright (illuminated) area of the pixel. There will be multiple pixels in the array that produce such a type of boundary signal.

Suppose now that the sensor and surface shift relative to each other at distance smaller than the size of the pixel. The bright/dark boundary will move, and the signal generated by a partially illuminated pixel will change. Therefore, even an individual pixel of finite size can produce signal proportional to a sub-pixel displacement. The resolution will depend on the dynamic range of the individual pixel.

Pattern processing from multiple pixels using the positional sensing methods or operating modes as described herein are adapted to provide position-proportional signals at very small displacements. Sub-pixel spatial resolution achievable is the size of the optical frame capture area corresponding to one pixel divided by achievable dynamic range of the optical transducer represented in counts. In a preferred embodiment utilizing a typical commercial CMOS sensor and 1:1 optics, sub-pixel spatial resolution of 0.03 micrometer may be attained. Using highest grade components, spatial resolution of 0.01 micrometer is achievable. Spatial resolution better than 0.01 micrometer can be achieved with enlarging optics. Normally occurring noise levels may tend to prohibit the exploitation of the full dynamic range, but with high redundancy of measured data from multiple pixels, theoretical or near-theoretical resolution may be attained. Measurement accuracy of at least +/−2 micrometers per meter is expected, and using higher grade components +/−0.5 micrometer per meter is achievable. Higher accuracy can be reached using enlarging optics and/or factory calibration and/or additional signal processing.

The sub-pixel resolution ability of positional sensing systems according to various embodiments as provided herein permit their use not only as a precise linear encoders (where nanometer-scale resolution may be impractical), but also as displacement sensors for small distances. There are known applications where small displacements in the range of tens or hundreds of microns need to be measured with nm-scale precision. One example of such an application is Atomic Force Microscopy, where a probe tip needs to be scanned across a sample with nm-scale resolution. Traditionally, capacitive, inductive, or optical interferometric sensors are used as a source of feedback signal in such applications. Positional sensing systems operating in a sub-pixel measurement mode as described above, can provide a cost efficient and robust alternative to existing solutions.

Precise movement of a readhead utilized in a positional sensing system according to the embodiment may be attained through the use of actuator and controller hardware sourced by Daedal/Parker Hannifin (Irwin, Pa.), for example from catalog number "8092/USA made," as available online at the following URL: http://www.parker.com/daedal/cat/english/SectionD.pdf, which catalog is hereby incorporated by referenced herein.

Figure 8:
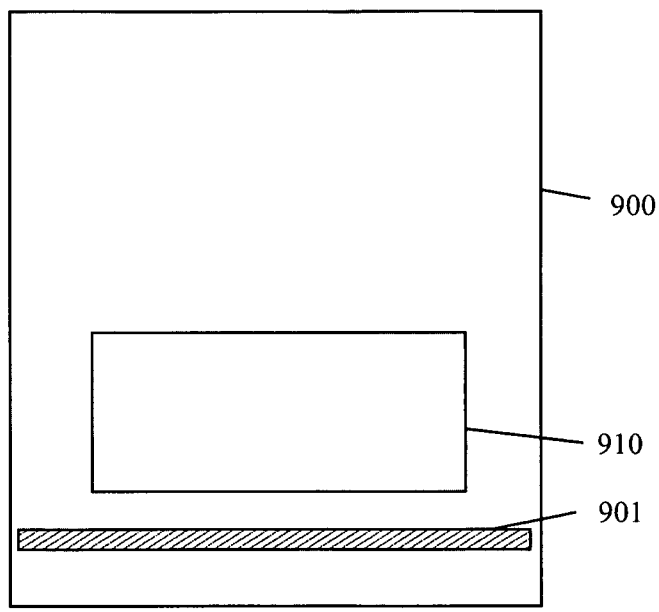
FIG. 8 illustrates a schematic of a device including an apparatus, as described herein, arranged for sensing at least one of position, displacement, velocity, acceleration, area, and volume.
Figure 9A:
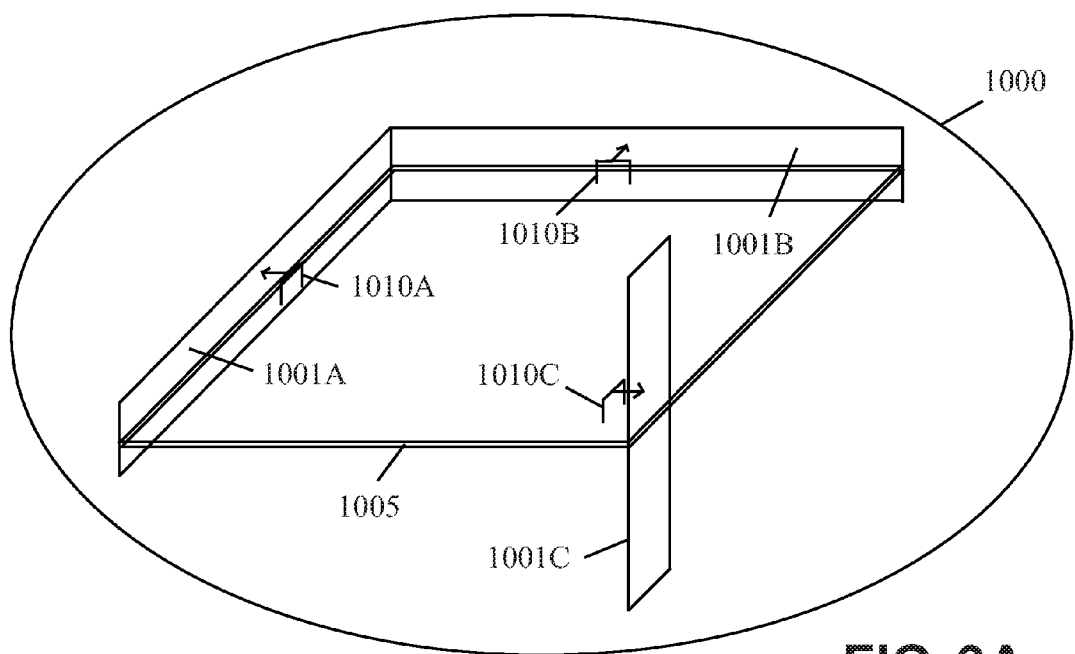
FIG. 9A illustrates schematically a portion of a device embodying a positional sensing system according to one embodiment of the present invention, with multiple readheads arranged to travel with a moveable table or slide relative to multiple uncalibrated patterned surfaces.
Figure 9B:
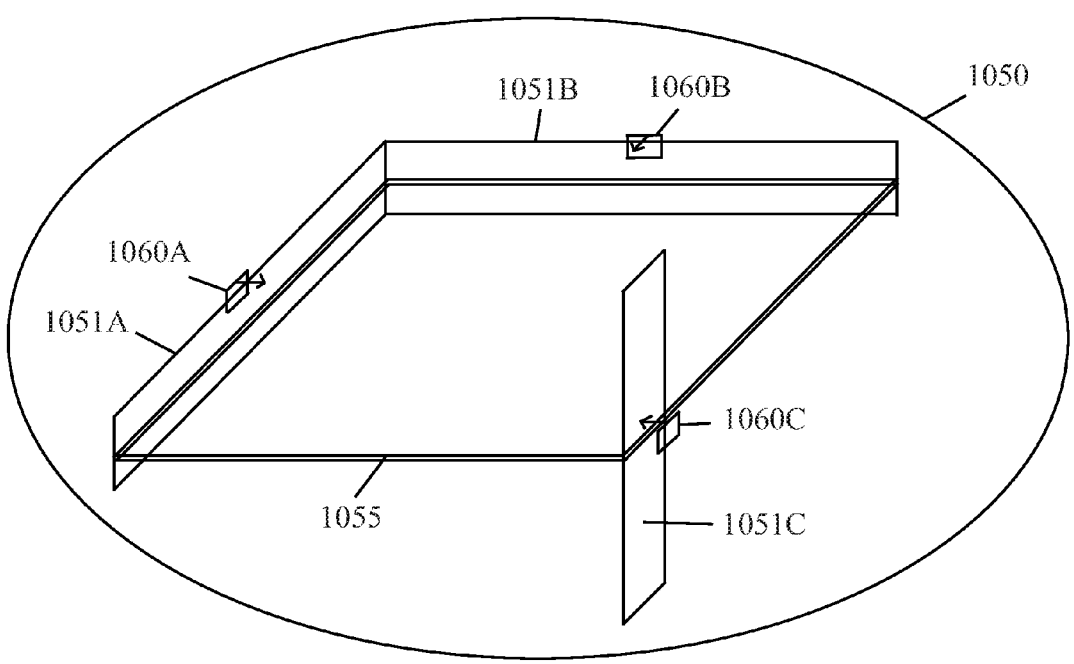
FIG. 9B illustrates schematically a portion of a device embodying a positional sensing system according to one embodiment of the present invention, with multiple uncalibrated patterned surfaces arranged to travel with a moveable table or slide relative to multiple fixed readheads.

Additional desirable applications for positional sensing systems as provided herein include: numerically controlled machines, surface profilers, optical scanners, optical microscopes, computer and/or polygraphic printers, semiconductor manufacturing machines, packaging machines, material deposition machines (e.g., for performing web (film) deposition, DNA array deposition, etc.), DNA readers, textile manufacturing machines, elevators, vehicles adapted to travel on at least one rail (e.g., including without limitation trains and amusement rides), industrial robotics, hard drive machines, and the like. FIG. 8 illustrates a device 900 arranged for use in any one of the foregoing applications, with the device 900 including an uncalibrated patterned surface 901 and positional sensing device 910 as described herein disposed proximate to the uncalibrated patterned surface 901. FIG. 9A illustrates schematically a portion of a device 1000 (such as embodied in one or more of the specific types mentioned above) embodying a positional sensing system according to one embodiment of the present invention, with multiple readheads 1010A-1010C arranged to travel with a moveable table or slide 1005 relative to multiple uncalibrated patterned surfaces 1001A-1001C. FIG. 9B illustrates schematically a portion of an alternative device 1050 (such as embodied in one or more of the specific types mentioned above) embodying a positional sensing system according to another embodiment of the present invention, with multiple uncalibrated patterned surfaces 1051A-1051C arranged to travel with a moveable table or slide 1055 relative to multiple fixed readheads 1060A-1060C. Although three readheads and three calibrated surfaces are shown in each of FIGS. 9A-9B, different numbers of readheads and calibrated surfaces may be present in operative device. As will be readily appreciated by one skilled in the art, positional sensing systems and methods as provided herein may be used not only for sensing position, but also velocity, acceleration, area, and/or volume as quantities derivable from positional measurement (e.g., with respect to time). A clocking element may be provided and utilized to supply time information necessary in certain embodiments to compute velocity and/or acceleration values.

One desirable enhancement to positional sensing systems described herein includes smart frame rate adjustment for optimized fast travel to a target location. A CMOS imager, as compared to other array detectors (CCD, gated arrays, etc.), can accomplish certain processing functions at the pixel level. For example, pixels can be binned to increase frame rate at the expense of spatial resolution. Such functionality may be usefully applied to implement advanced travel algorithms. In one embodiment, the readhead utilizes binned high frame rates (high travel speeds) to arrive in the vicinity of the destination, with subsequent slower, more precise zooming in without pixel binning and an accompanying lower travel speed utilized when the readhead is proximate to the target location.

While conventional linear encoders are limited to travel in a one-dimensional linear path, positional sensing systems as provided herein are not so limited and provide substantially more flexibility. Positional sensing systems as provided herein may travel in paths taking any desirable path shape that is preferably well defined and repeatable. Examples of non-linear paths readily attained by systems according to embodiments of the present invention include: two-dimensional segmented linear paths with segments oriented at a non-zero angle relative to one another; two-dimensional segmented paths having curved segments; three-dimensional paths following a spatial contour; sinusoidal paths, and the like. Traditional scale-based linear encoder typically cannot measure position along such complex paths without implementing high cost, custom scales, which may be impractical or nearly impossible.

If desired, an optional cleaning element may be added to or associated with positional sensing systems according to the present invention. For example, a source of compressed air or suction may be applied to a patterned surface (e.g., adjacent to the readhead) to eliminate debris in environments such as with numerically controlled cutting machines. If provided, a cleaning element may be utilized to clean the patterned surface and/or readhead as the readhead moves.

In further embodiments, positional sensing systems and methods adapted to reduce viewing angle error are provided. As indicated previously, telecentric lenses may be used to mitigate viewing angle/scale change errors, but at the expense of affecting measuring accuracy. Two techniques have been developed to overcome this limitation.

Figure 5:
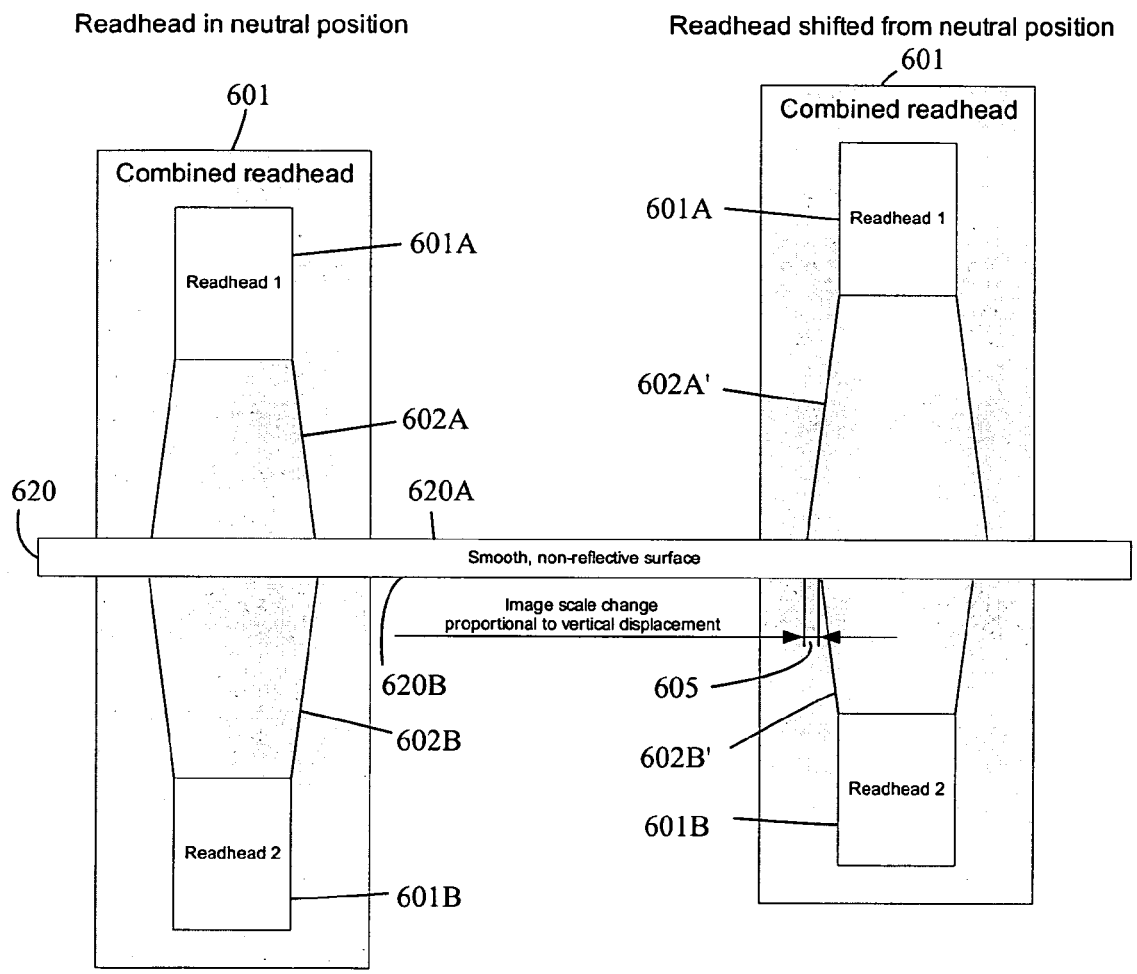
FIG. 5 illustrates a schematic of a dual readhead assembly having one readhead each disposed on opposite sides of a target surface, showing the two readheads in a first neutral (e.g., equidistant) position relative to the target surface, and showing the two readheads in a second non-neutral position relative to the target surface.
Figure 6:
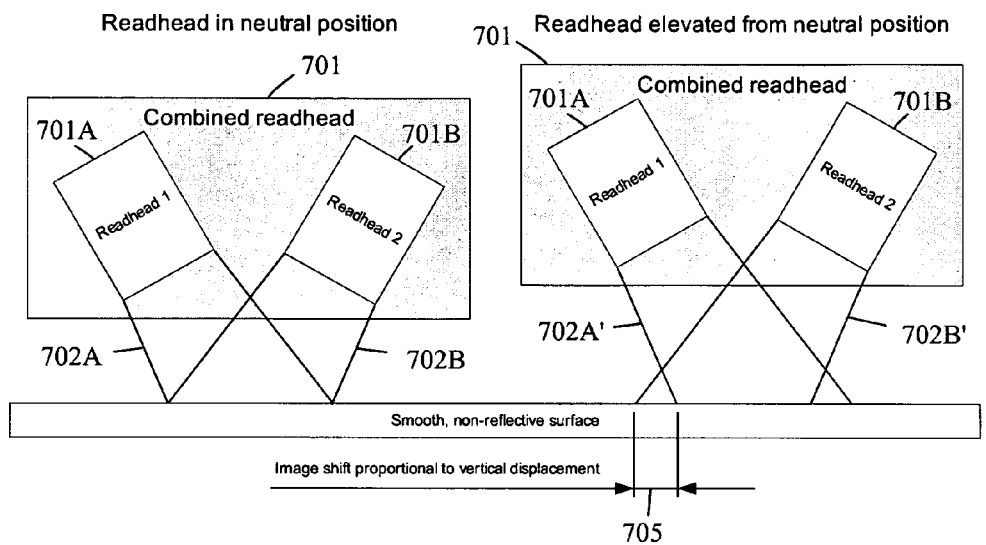
FIG. 6 illustrates a schematic of a dual readhead assembly having two readheads positioned at different angle relative to one side of a target surface, showing the assembly in a first neutral position relative to the target surface, and showing the assembly in a second non-neutral position relative to the target surface.

Systems lacking telecentric lenses while adapted to mitigate viewing angle error are illustrated in FIGS. 5-6. FIG. 5 shows a readhead assembly 601 having two readheads 601A, 601B disposed on opposite sides of a patterned surface 620 but adapted to move in concert. Each readhead has a field of view 602A, 602B. When disposed in a neutral position (illustrated at left in FIG. 5), each readhead 601A, 601B is disposed equidistantly from the patterned surface 620 (having a first side 620A proximate to the first readhead 601A, and a second side 620B proximate to the second readhead 601B) such that the fields of view are coincident. The readhead is calibrated for the neutral position, and in such arrangement both readheads will measure exactly the same displacement. If the readheads 601A, 601B become misaligned relative to the neutral position, the patterned surface 620 will be closer to one readhead (e.g., readhead 601B at right in FIG. 5) and the readhead will measure less than expected displacement due to scale change. At the same time, the opposite readhead (e.g., readhead 601A) will be farther away from the patterned surface 620 and it will measure more than expected displacement. The image scale change 605 is proportional to vertical displacement. By comparison of the images from two readheads 601A, 601B, the vertical displacement can be deduced at each step and the measured horizontal displacement scaled accordingly. In some situations, however, it is not always possible to have the scale enclosed between two readheads, giving rise to the multiple readhead embodiment shown in FIG. 6.

FIG. 6 illustrates a dual readhead assembly 701 having two readheads 701A, 701B disposed at different (but preferably complementary) angles relative to a one side of a patterned surface 720, such that both readheads point to the same spot on the surface. The readhead assembly 701 is calibrated for the position where both readheads 701A, 701B see the same spot. If readhead assembly 701 is elevated from this 'neutral' position away from or towards the patterned surface 720, the spot each readhead 701A, 701B sees will shift proportional to the vertical displacement as seen at right in FIG. 6. The image shift 705 is proportional to vertical displacement. From the shift of images from two readheads 701A, 701B, the vertical displacement can be deduced at each step and the measured horizontal displacement scaled according to the lens viewing angle.

Figure 7:
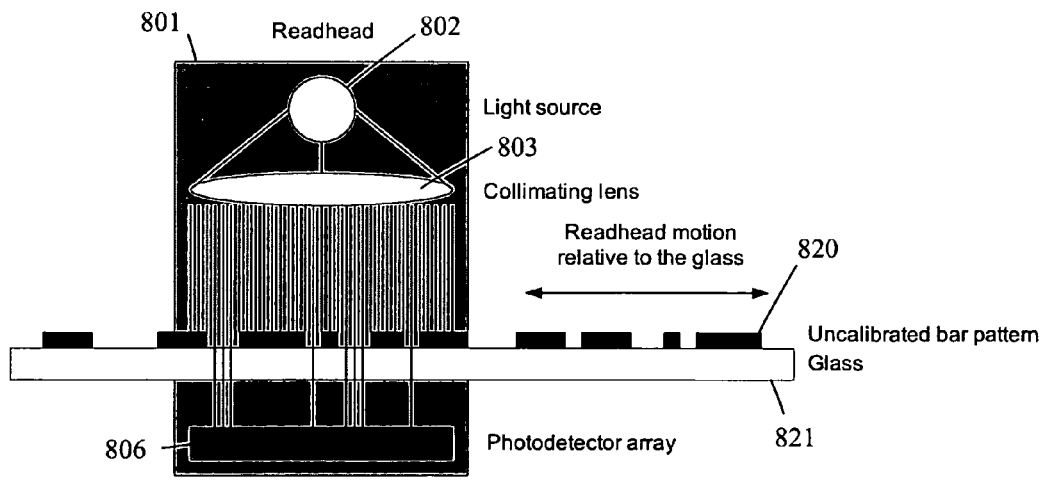
FIG. 7 illustrates a schematic of a readhead assembly having a radiation source and collimating lens disposed along a first side of an patterned surface having optically transmissive portions, and having a photodetector array disposed along a second side of the uncalibrated patterned surface to receive radiation transmitted through the optically transmissive portions of the patterned surface.

FIG. 7 shows an alternative embodiment having a readhead 801, a light source 802, a collimating lens 803, an uncalibrated pattern 820 added to a clear substrate 821 such as glass, and a photodetector array 806 disposed on an opposite side of the substrate 821 from the light source 802.

While the invention has been described herein with respect to various illustrative aspects, features and embodiments, it will be recognized that the invention is not thus limited, but that the present invention extends to and encompasses other features, modifications, and alternative embodiments, as will readily suggest themselves to those of ordinary skill in the art based on the disclosure and illustrative teachings herein. The claims that follow are therefore to be construed and interpreted as including all such features, modifications and alternative embodiments, within their spirit and scope.

What is claimed is:

1. A method for sensing any of position, displacement, velocity, acceleration, area, and volume utilizing a memory, processing electronics, and at least one readhead having a radiation source, a lens, and a multi-pixel optical array transducer positioned to receive radiation emanating from the radiation source, the method comprising the steps of:
    positioning the at least one readhead proximate to an uncalibrated patterned surface;
    utilizing a controllable actuating element to effect automated initial relative movement between (i) the at least one readhead and (ii) the patterned surface along a predetermined path;
    using the optical array transducer to image multiple portions of the uncalibrated patterned surface and thereby acquire a plurality of position-dependent intensity data sets representative of the uncalibrated patterned surface;
    generating a mapping data set representative of an intensity map of the uncalibrated patterned surface correlated to position along the uncalibrated patterned surface, said mapping data set being distinct from any data set of the plurality of position-dependent intensity data sets; and
    utilizing said actuating element to effect automated subsequent relative movement between (i) the at least one readhead and (ii) the uncalibrated patterned surface along said predetermined path, wherein said subsequent relative movement is controlled utilizing said mapping data set.

2. The method of claim 1, further comprising the step of applying a patterned material to an underlying surface to form the uncalibrated patterned surface.

3. The method of claim 1, further comprising the step of sensing relative position of the at least one readhead, wherein the relative position sensing step utilizes any position-dependent intensity data set of the plurality of position-dependent intensity data sets.

4. The method of claim 1, further comprising the step of utilizing the mapping data set to mitigate accumulation of positional error.

5. The method of claim 1, further comprising the step of sensing absolute position of the at least one readhead, wherein the absolute position sensing step utilizes the mapping data set.

6. The method of claim 1, further comprising the step of moving the at least one readhead in at least two dimensions of travel.

7. The method of claim 1, further comprising the step of moving the at least one readhead in a curvilinear path.

8. The method of claim 1 wherein the at least one readhead has a variable travel speed, the method further comprising the steps of:
    identifying a desired readhead destination;
    effecting relative movement between (i) the at least one readhead and (ii) the patterned surface at a first travel speed to a first position proximate to the desired readhead destination;
    decelerating the patterned surface or the at least one readhead to a second travel speed upon attainment of the first position; and
    effecting relative movement between (i) the at least one readhead and (ii) the patterned surface from the first position to the desired readhead destination at the second travel speed.

9. The method of claim 1, further comprising the step of repetitively flashing the radiation source, wherein the readhead has a travel speed relative to the uncalibrated patterned surface, and the flashing rate of the radiation source is varied with the travel speed.

10. The method of claim 1, wherein the mapping data set generating step includes processing the plurality of position-dependent intensity data sets.

11. The method of claim 1, wherein the patterned surface is stationary, and said effecting of automated initial and subsequent automated movement between (i) the at least one readhead and (ii) the patterned surface along a predetermined path includes moving the readhead.

12. The method of claim 1, further comprising the steps of:
detecting an alteration of a previously-mapped portion of the uncalibrated patterned surface;
acquiring at least one new position-dependent intensity data set using the optical transducer; and
updating the mapping data set.

13. The method of claim 1, wherein:
the at least one readhead comprises a plurality of readheads adapted to move in concert, the plurality of readheads positioned either:
  (1) with a first readhead disposed along a first side of the patterned surface, and a second readhead disposed along a second side of the patterned surface; or
  (2) with a first readhead and a second readhead disposed at different angles along a first side of the patterned surface;
the method further comprising the steps of:
acquiring position-dependent intensity data sets substantially simultaneously using the first readhead and the second readhead; and
averaging or comparing position-dependent intensity data sets acquired by the first readhead and the second readhead.

14. An apparatus comprising (a) a memory, (b) processing electronics, and (c) at least one readhead having a radiation source, a lens, and a multi-pixel optical array transducer positioned to receive radiation emanating from the radiation source, wherein the processing electronics include a microprocessor arranged to implement pre-defined or user-defined instructions and adapted to perform the method of claim 1.

15. A device including the apparatus of claim 14 disposed proximate to an uncalibrated patterned surface and arranged for sensing at least one of position, displacement, velocity, acceleration, area, and volume, the device being selected from the group consisting of: a numerically controlled machine, a scanning probe microscope, a surface profiler, an optical scanner, a computer printer, a polygraphic printer, a packaging machine, a web or film deposition machine, a DNA array deposition machine, a reader for DNA arrays, an optical microscope, a semiconductor manufacturing machine, a textile manufacturing machine, an elevator, an amusement ride, and a vehicle adapted to adapted to travel on at least one rail.

16. The method of claim 1, wherein the uncalibrated patterned surface comprises any of a uniquely patterned surface, a non-repeating patterned surface, and a random patterned surface.

17. The method of claim 1, wherein the uncalibrated patterned surface comprises any of surface texture, machining marks, a barcode, and a pixellated pattern.

18. The method of claim 1, wherein the predetermined path includes a slide or rail.

19. A method for sensing any of position, displacement, velocity, acceleration, area, and volume utilizing (i) a memory, (ii) processing electronics, and (iii) at least one readhead having a radiation source, a lens, and a multi-pixel optical array transducer positioned to receive radiation emanating from the radiation source, the method comprising the steps of:
positioning the at least one readhead at an initial position proximate to an uncalibrated patterned surface extending along a readhead path;
identifying a desired readhead destination utilizing a mapping data set that is representative of an intensity map of the patterned surface and is correlative of position along the patterned surface in a readhead travel direction;
sensing absolute position or relative position of the at least one readhead or the patterned surface from the initial position to a first position disposed between the initial position and the desired readhead destination along the readhead travel direction, by imaging multiple portions of the patterned surface to generate intensity data, and by comparing said intensity data to the mapping data set;
effecting relative movement between (i) the at least one readhead and (ii) the patterned surface at a first travel speed to cause the at least one readhead to be located at the first position;
decelerating any of the patterned surface and the at least one readhead to a second travel speed upon attainment of the first position; and
effecting relative movement at the second travel speed between (i) the at least one readhead and (ii) the patterned surface, to cause the at least one readhead to be located at the desired readhead destination.

20. The method of claim 19, further comprising the step of acquiring a plurality of position-dependent intensity data sets between the first position and the desired readhead destination using the optical transducer.

21. The method of claim 19, further comprising the step of sensing relative position of the at least one readhead between the first position and the desired readhead destination.

22. The method of claim 19, further comprising the step of acquiring a plurality of position-dependent intensity data sets after the relative movement to the desired readhead destination is effected.

23. The method of claim 19, further comprising the step of moving the at least one readhead in at least two dimensions of travel.

24. The method of claim 19, further comprising the step of repetitively flashing the radiation source.

25. The method of claim 24, wherein the flashing rate of the radiation source is varied with travel speed between (i) the at least one readhead and (ii) the patterned surface.

26. The method of claim 19, wherein the patterned surface is stationary, and the effecting relative movement step includes moving the at least one readhead.

27. The method of claim 19, further comprising the steps of:
detecting an alteration of a previously-mapped portion of the uncalibrated patterned surface;
acquiring at least one new position-dependent intensity data set using the optical transducer; and
updating the mapping data set.

28. The method of claim 19, wherein the at least one readhead comprises a plurality of readheads adapted to move in concert, positioned either:
  (1) with a first readhead disposed along a first side of the patterned surface, and a second readhead disposed along a second side of the patterned surface; or
  (2) with a first readhead and a second readhead disposed at different angles along a first side of the patterned surface;

the method further comprising the steps of:
acquiring position-dependent intensity data sets substantially simultaneously using the first readhead and the second readhead; and
averaging or comparing position-dependent intensity data sets acquired by the first readhead and the second readhead.

29. An apparatus comprising (a) a memory, (b) processing electronics, and (c) at least one readhead having a radiation source, a lens, and a multi-pixel optical array transducer positioned to receive radiation emanating from the radiation source, wherein the processing electronics include a microprocessor arranged to implement pre-defined or user-defined instructions and adapted to perform the method of claim 19.

30. A device including the apparatus of claim 29 disposed proximate to an uncalibrated patterned surface and arranged for sensing at least one of position, displacement, velocity, acceleration, area, and volume, the device being selected from the group consisting of: a numerically controlled machine, a scanning probe microscope, a surface profiler, an optical scanner, a computer printer, a polygraphic printer, a packaging machine, a web or film deposition machine, a DNA array deposition machine, a reader for DNA arrays, an optical microscope, a semiconductor manufacturing machine, a textile manufacturing machine, an elevator, an amusement ride, and a vehicle adapted to travel on at least one rail.

31. A method for sensing any of position, displacement, velocity, acceleration, area, and volume utilizing (i) a patterned surface extending along a predetermined readhead path, (ii) a memory, (iii) processing electronics, and (iv) a plurality of readheads each having a radiation source, a lens, and a multi-pixel optical array transducer positioned to receive radiation emanating from the radiation source, the method comprising the steps of:
effecting automated initial relative movement between (i) each readhead of the plurality of readheads in concert and (ii) the patterned surface along the predetermined path;
acquiring position-dependent intensity data sets substantially simultaneously using the first readhead and the second readhead, wherein each intensity data set is representative of radiation that emanates from the radiation source and is either transmitted through or reflected from the patterned surface;
averaging or comparing position-dependent intensity data sets acquired by the first readhead and the second readhead to yield a mapping data set that is representative of an intensity map of the patterned surface and correlative of position along the patterned surface in a readhead travel direction;
storing the mapping data set in the memory; and
effecting automated subsequent relative movement between (i) each readhead of the plurality of readheads in concert and (ii) the patterned surface along said predetermined path, wherein said subsequent relative movement is controlled utilizing said mapping data set.

32. The method of claim 31, further comprising the step of scaling a measured horizontal displacement between (i) at least one readhead of the plurality of readheads and (ii) the patterned surface.

33. The method of claim 31 wherein the patterned surface is uncalibrated.

34. The method of claim 31, further comprising the step of repetitively flashing the radiation source, wherein the readhead has a travel speed relative to the uncalibrated patterned surface, and the flashing rate of the radiation source is varied with the travel speed.

35. An apparatus comprising (a) a memory, (b) processing electronics, and (c) a plurality of readheads each having a radiation source, a lens, and a multi-pixel optical array transducer positioned to receive radiation emanating from the radiation source, wherein the processing electronics include a microprocessor arranged to implement pre-defined or user-defined instructions and adapted to perform the method of claim 31.

36. A device including the apparatus of claim 35 disposed proximate to a patterned surface and arranged for sensing at least one of position, displacement, velocity, acceleration, area, and volume, the device being selected from the group consisting of: a numerically controlled machine, a scanning probe microscope, a surface profiler, an optical scanner, a computer printer, a polygraphic printer, a packaging machine, a web or film deposition machine, a DNA array deposition machine, a reader for DNA arrays, an optical microscope, a semiconductor manufacturing machine, a textile manufacturing machine, an elevator, an amusement ride, and a vehicle adapted to adapted to travel on at least one rail.

37. A system for sensing any of position, displacement, velocity, acceleration, area, and volume utilizing an uncalibrated patterned surface, the system comprising:
a plurality of moveable readheads having an associated controllable actuating element adapted to automatically move the plurality of readheads proximate to the uncalibrated patterned surface, wherein the readheads are arranged to travel in concert relative to the uncalibrated surface along a readhead travel path, and each readhead has a radiation source, a lens, and a multi-pixel optical array transducer positioned to receive radiation that emanates from the radiation source and is either transmitted through or reflected by the uncalibrated patterned surface;
processing electronics arranged to (A) receive intensity data information representative of the uncalibrated patterned surface, (B) generate a mapping data set that is representative of an intensity map of the uncalibrated patterned surface and that is correlative of position along the patterned surface in a readhead travel direction, and (C) determine at least one of incremental position and absolute position of the plurality of readheads coincident with readhead travel distance along the readhead travel path; and
a memory operatively coupled with the processing electronics, wherein the memory is arranged to store any of (i) intensity data information and (ii) absolute position information.

38. The system of claim 37, wherein the plurality of readheads comprises a first readhead disposed along a first side of the patterned surface, and a second readhead disposed along a second side of the patterned surface.

39. The system of claim 37, wherein the plurality of readheads comprises a first readhead and a second readhead disposed at different angles along a first side of the patterned surface.

40. The system of claim 37, wherein the plurality of readheads are adapted to move in concert in at least two dimensions of travel.

41. The system of claim 37, further comprising a patterned film employed as the uncalibrated patterned surface.

42. The system of claim 41, wherein the patterned film comprises a self-adhesive material.

43. The system of claim 37, wherein the plurality of readheads is adapted to move in at least two dimensions of travel.

44. The system of claim 37, wherein the plurality of readheads is adapted to move in a curvilinear path.

45. The system of claim 37, wherein the plurality of readheads is adapted to move in three dimensions of travel.

46. The system of claim 37, generating an output signal indicative of any of position, displacement, velocity, acceleration, area, and volume, with a resolution of less the width of one pixel of each multi-pixel optical array transducer.

47. The system of claim 37, wherein each readhead of the plurality of readheads comprises a freeze-frame electronic shutter adapted to simultaneously expose substantially all of the pixels of the multi-pixel optical array transducer.

48. A device including the apparatus of claim 37 disposed proximate to an uncalibrated patterned surface and arranged for sensing at least one of position, displacement, velocity, acceleration, area, and volume, the device being selected from the group consisting of: a numerically controlled machine, a scanning probe microscope, a surface profiler, an optical scanner, a computer printer, a polygraphic printer, a packaging machine, a web or film deposition machine, a DNA array deposition machine, a reader for DNA arrays, an optical microscope, a semiconductor manufacturing machine, a textile manufacturing machine, an elevator, an amusement ride, and a vehicle adapted to adapted to travel on at least one rail.

* * * * *